(12) United States Patent
Rhodes et al.

(10) Patent No.: US 9,817,389 B2
(45) Date of Patent: *Nov. 14, 2017

(54) ADAPTIVELY MACHINING COMPONENT SURFACES AND HOLE DRILLING

(71) Applicant: Rolls-Royce Corporation, Indianapolis, IN (US)

(72) Inventors: Jeffrey F. Rhodes, Zionsville, IN (US); Timothy Paul Fuesting, Thorntown, IN (US); Joseph Peter Henderkott, Westfield, IN (US); Ronald J. Snyder, Franklin, IN (US); John F. Click, Avon, IN (US); Larry Allen Junod, Greencastle, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 450 days.

This patent is subject to a terminal disclaimer.

(21) Appl. No.: 14/197,876

(22) Filed: Mar. 5, 2014

(65) Prior Publication Data
US 2014/0257543 A1 Sep. 11, 2014

Related U.S. Application Data

(60) Provisional application No. 61/772,848, filed on Mar. 5, 2013, provisional application No. 61/775,010, filed on Mar. 8, 2013.

(51) Int. Cl.
*G05B 19/4099* (2006.01)
*G05B 19/4097* (2006.01)
*G05B 19/42* (2006.01)

(52) U.S. Cl.
CPC ..... *G05B 19/4099* (2013.01); *G05B 19/4097* (2013.01); *G05B 19/4207* (2013.01); *G05B 2219/45147* (2013.01)

(58) Field of Classification Search
CPC ............ G05B 19/4097; G05B 19/4099; G05B 19/4207; G05B 2219/45147
(Continued)

(56) References Cited

U.S. PATENT DOCUMENTS 4,509,126 A * 4/1985 Olig ................... G05B 19/4163
318/561
4,937,768 A * 6/1990 Carver ................ B29C 67/0074
345/420
(Continued)

FOREIGN PATENT DOCUMENTS

EP 2070641 A2 6/2009
GB 2350809 A 12/2000

OTHER PUBLICATIONS

Mori et al., "A study on energy efficiency improvement for machine tools", CIRP, 2011, 4pg.*
(Continued)

*Primary Examiner* — Ryan Coyer
(74) *Attorney, Agent, or Firm* — Shumaker & Sieffert, P.A.

(57) ABSTRACT

A method includes receiving a design surface data set, obtaining a component surface data set from the inspection of a component, creating a modified surface data set in response to the design surface data set and the component surface data set, generating a machining path in response to the modified surface data set, and machining the component in response to the machining path to produce a machined component according to the modified surface data set. The machined component deviates from the design surface data set.

17 Claims, 6 Drawing Sheets

(58) Field of Classification Search
USPC .......................................................... 700/97
See application file for complete search history.

(56) References Cited

U.S. PATENT DOCUMENTS

| | | | | |
|---|---|---|---|---|
| 4,945,488 | A * | 7/1990 | Carver | ................ B29C 67/0074 700/182 |
| 4,956,764 | A * | 9/1990 | Carver | ................ B29C 67/0074 33/547 |
| 5,023,800 | A * | 6/1991 | Carver | ................ G05B 19/4097 700/182 |
| 5,285,572 | A | 2/1994 | Rathi et al. | |
| 5,288,199 | A * | 2/1994 | Enomoto | .......... H01L 21/67742 414/744.6 |
| 5,388,199 | A * | 2/1995 | Kakazu | .............. G05B 19/4097 345/420 |
| 6,701,615 | B2 | 3/2004 | Harding et al. | |
| 6,745,101 | B2 | 6/2004 | Andersen et al. | |
| 6,832,128 | B2 | 12/2004 | Haupt | |
| 6,912,446 | B2 | 6/2005 | Wang et al. | |
| 6,969,821 | B2 | 11/2005 | Mika et al. | |
| 7,472,478 | B2 | 1/2009 | Graham et al. | |
| 7,797,828 | B2 | 9/2010 | Beeson et al. | |
| 8,712,577 | B2 * | 4/2014 | Gu | ....................... G05B 19/401 409/131 |
| 8,844,132 | B2 | 9/2014 | Blais et al. | |
| 8,904,636 | B2 | 12/2014 | Blais et al. | |
| 9,269,189 | B1 | 2/2016 | Marinov et al. | |
| 2003/0004606 | A1 | 1/2003 | Duffin | |
| 2003/0200005 | A1 | 10/2003 | Hirai et al. | |
| 2006/0253270 | A1 | 11/2006 | Nguyen | |
| 2007/0012858 | A1 * | 1/2007 | Callis | ....................... B29C 33/38 249/134 |
| 2008/0269944 | A1 | 10/2008 | Hoffmann et al. | |
| 2009/0144980 | A1 * | 6/2009 | Rangarajan | ............. B23P 6/007 29/889.1 |
| 2009/0319077 | A1 | 12/2009 | Cameron | |
| 2010/0030366 | A1 | 2/2010 | Scherer | |
| 2010/0034029 | A1 | 2/2010 | Xiong et al. | |
| 2010/0095526 | A1 | 4/2010 | Derrien et al. | |
| 2010/0121478 | A1 | 5/2010 | Jahn et al. | |
| 2010/0161107 | A1 | 6/2010 | Kappmeyer et al. | |
| 2012/0154570 | A1 * | 6/2012 | Bunker | ................... F01D 5/005 348/86 |
| 2014/0228996 | A1 * | 8/2014 | Owens | ................. G05B 19/401 700/114 |
| 2014/0257551 | A1 | 9/2014 | Junod et al. | |
| 2016/0259322 | A1 | 9/2016 | Henderkott | |

OTHER PUBLICATIONS

Pham et al., "Micro-EDM—recent developments and research issues", Journal of Materials Processing Technology, 2004, 8pg.*
International Search Report and Written Opinion of counterpart international application No. PCT/US2014/020718, dated Aug. 6, 2014, 11 pp.
International Preliminary Report on Patentability from counterpart International Application No. PCT/US2014/020718, dated Sep. 17, 2015, 9 pp.
Office Action from U.S. Appl. No. 14/198,103, dated May 20, 2016, 16 pp.
Response to Office Action dated May 20, 2016, from U.S. Appl. No. 14/198,103, filed Aug. 22, 2016, 11 pp.
Response to Final Office Action dated Nov. 30, 2016; Jan. 30, 2017 from U.S. Appl. No. 14/198,103, 10 pp.
Advisory Action dated Feb. 13, 2017 for U.S. Appl. No. 14/198,103, 3 pp.
Final Office Action from U.S. Appl. No. 14/198,103, dated Nov. 30, 2016, 16 pp.
Office Action from U.S. Appl. No. 14/198,103, dated Mar. 9, 2017, 28 pp.
Response to Office Action from U.S. Appl. No. 14/198,103, dated Mar. 9, 2017, filed Jun. 9, 2017, 11 pp.
Notice of Allowance from U.S. Appl. No. 14/198,103, dated Jul. 26, 2017, 5 pp.

* cited by examiner

ADAPTIVELY MACHINING COMPONENT SURFACES AND HOLE DRILLING

This application claims the benefit of U.S. Provisional Application No. 61/772,848, filed Mar. 5, 2013 and also claims the benefit of U.S. Provisional Application No. 61/775,010, filed Mar. 8, 2013. The entire contents of both of these applications are incorporated by reference herein.

TECHNICAL FIELD

This disclosure generally relates to machining methods, and more particularly, but not exclusively, to adaptive surface machining methods.

BACKGROUND

Various systems and methods exist for machining components having complex shapes and surfaces that are susceptible to geometric variations, such as blades and vanes of gas turbine engines. Some existing systems and methods have various shortcomings, drawbacks, and disadvantages relative to certain applications. Accordingly, there remains a need for further contributions in this area of technology.

SUMMARY

This disclosure includes unique machining methods as well as apparatuses, systems, devices, hardware, methods, and combinations for adaptive machining methods.

In one example, this disclosure is directed to a method comprising receiving a design surface data set, obtaining a component surface data set from the inspection of a component, creating a modified surface data set in response to the design surface data set and the component surface data set, generating a machining path in response to the modified surface data set, and machining the component in response to the machining path to produce a machined component according to the modified surface data set. The machined component deviates from the design surface data set.

In another example, this disclosure is directed to an adaptive machining system comprising a processor configured to compare electronic measured component surface data set of a component with a design surface data set of the component, create a modified surface data set in response to the design surface data set and the component surface data set, and generate a machining path in response to the modified surface data set. The adaptive machining system further comprises a numerical control machine configured to machine the component according to the machining path to produce a machined component according to the modified surface data set, wherein the machined component deviates from the design surface data set.

In a further example, this disclosure is directed to a computer system-readable storage medium that stores computer system-executable instructions that, when executed, configure a computer system to receive a design surface data set, obtain a component surface data set from the inspection of a component, create a modified surface data set in response to the design surface data set and the component surface data set, generate a machining path in response to the modified surface data set, and communicate the machining path to numerical control machine configured to machine the component according to the machining path.

The details of one or more examples of this disclosure are set forth in the accompanying drawings and the description below. Other features, objects, and advantages of this disclosure will be apparent from the description and drawings.

DETAILED DESCRIPTION

For the purposes of promoting an understanding of the principles of the disclosure, reference will now be made to the examples illustrated in the drawings and specific language will be used to describe the same. It will nevertheless be understood that no limitation of the scope of the disclosure is thereby intended. Any alterations and further modifications in the described examples, and any further applications of the principles of the disclosure as described herein are contemplated as would normally occur to one skilled in the art to which the disclosure relates.

One example of the present application includes techniques for adaptively machining and drilling features in contoured gas turbine engine component surfaces. A further example can include adaptively machining the gas turbine engine component surface before a bonding process. Other examples, as understood by one of ordinary skill in the art, are contemplated that would include components with complex surface geometries requiring a level of precision in machining, polishing and the like.

Figure 1:
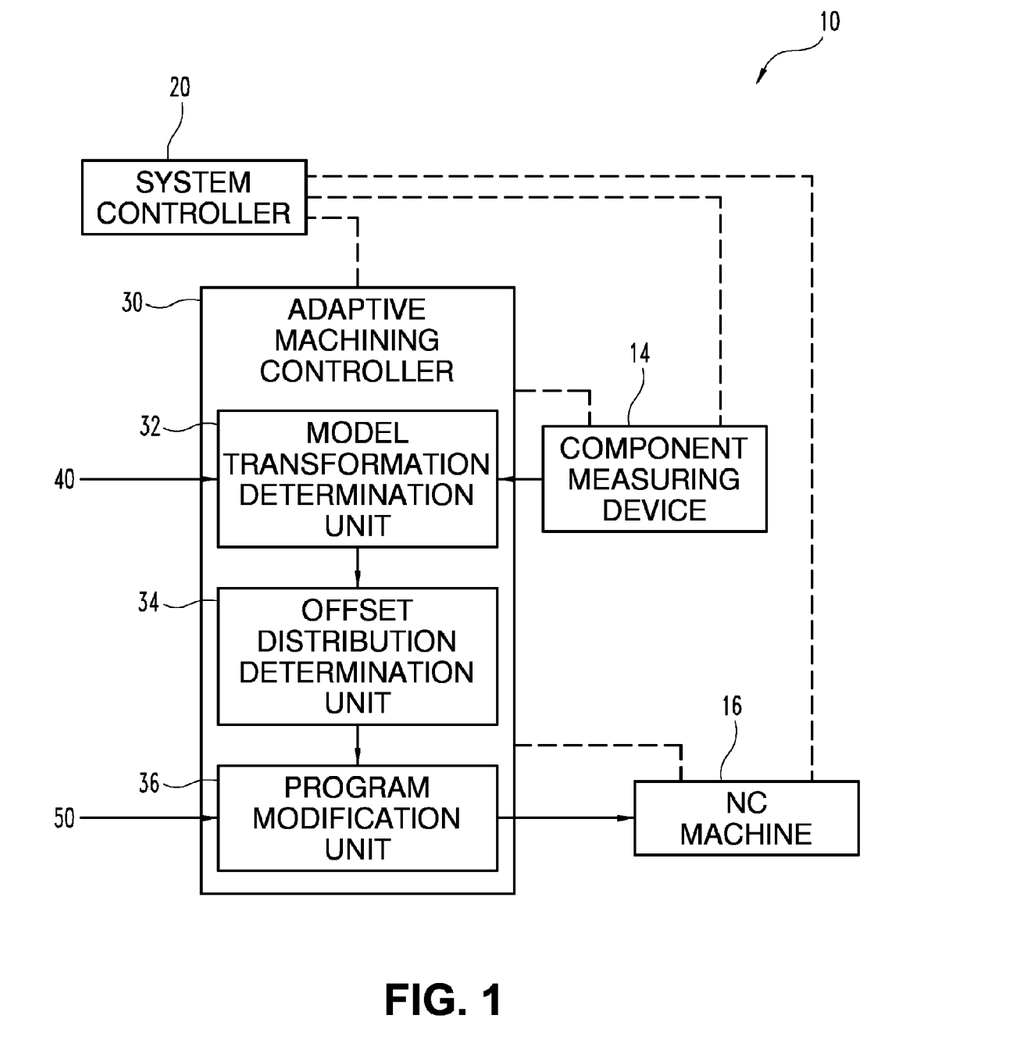
FIG. 1 is a functional block diagram illustrating an example adaptive machining system.

FIG. 1 is a functional diagram illustrating an example adaptive machining system 10. Adaptive machining system 10 of the FIG. 1 is described in the context of machining a gas turbine engine airfoil spar, which is a component of an airfoil such as a blade or vane of a gas turbine engine. However, it will be understood by those of ordinary skill in the art that adaptive machining system 10 is not limited in application to airfoil spars, and other example applications are contemplated. Thus, adaptive machining system 10 of the present disclosure can be applied to the processing of any parts or components having complex shapes and/or surfaces that are susceptible to geometric variations. A few non-limiting examples to which adaptive machining system 10 can be applied include components in the aerospace industry, such as landing gear components or wing and fuselage components; the turbomachinery industry, such as turbine components and compressor components; the automobile industry, such as press tools for body panels; and other manufacturing industries. In some examples, adaptive machining system 10 can be applied to the repair of components, for example the repair of gas turbine engine blades and/or vanes. Adaptive machining system 10 can be used for any suitable machining process including, for example, milling, grinding, and/or polishing, to name a few. In some examples, adaptive machining system 10 can be used where multiple components in a stock or batch have slight variances in their size and/or surface geometries.

In the example illustrated in FIG. 1, adaptive machining system 10 includes a component measuring device 14, a numerical control (NC) machine 16, a system controller 20, and an adaptive machining controller 30. Adaptive machining controller 30 includes a model transformation determination unit 32, an offset distribution determination unit 34, and a program modification unit 36. System controller 20 can be configured to control operation of component measuring device 14, NC machine 16, and adaptive machining controller 30. As will be described in greater detail below, Adaptive machining controller 30 can be configured to compare electronic surface model data of a component such as an airfoil spar to surface data measured by component measuring device 14 and, based on the results of the surface data comparison, adapt machine tool program instructions to be used by NC machine 16.

System controller 20 and adaptive machining controller 30 can be in communication with each other and in communication with component measuring device 14 and NC machine 16 by use of shared memory or communication buses, and/or RF communications. System controller 20 and/or adaptive machining controller 30 can include a microprocessor or multiple microprocessors capable of executing and/or outputting command signals in response to received and/or stored data. In some examples, system controller 20 and/or adaptive machining controller 30 can include computer-readable storage, such as read-only memories (ROM), random-access memories (RAM), and/or flash memories, or any other components for running an application and processing data for controlling operations associated with adaptive machining system 10. Thus, in some examples, system controller 20 and/or adaptive machining controller 30 can include instructions and/or data stored as hardware, software, and/or firmware within the one or more memories, storage devices, and/or microprocessors. In some examples, adaptive machining controller 30 can include and/or be associated with surface modeling circuitry, regression analysis circuitry, program code modification circuitry, switches, and/or other types of circuitry, as suited for an adaptive machining application. In the illustrated example, system controller 20 and adaptive machining controller 30 include multiple controllers. In an alternative example, system controller 20 and adaptive machining controller 30 can include a single controller.

System controller 20 and adaptive machining controller 30 can include one or more data storage structures in a computer-readable medium, or media, containing predetermined data to facilitate operation of adaptive machining system 10 in connection with an algorithm of adaptive machining system 10. The data storage structures can include, for example, equations, arrays, matrices, tables, etc. In some examples, predetermined data can be based on, for example, the material and casting characteristics of a component such as an airfoil spar, the intended shape of the airfoil spar, inspection tolerances, machine tool paths, speed, wear, and cutting time, as well as temperature, pressure, and other machining environmental factors. In some examples, predetermined data may be derived from performance test results, engineering knowledge, and/or other resources. For example, the data storage may include an appropriate amount grinding and polishing, and/or an appropriate tool speed, to effect a desired smoothness or contour of the airfoil spar.

Figure 2:
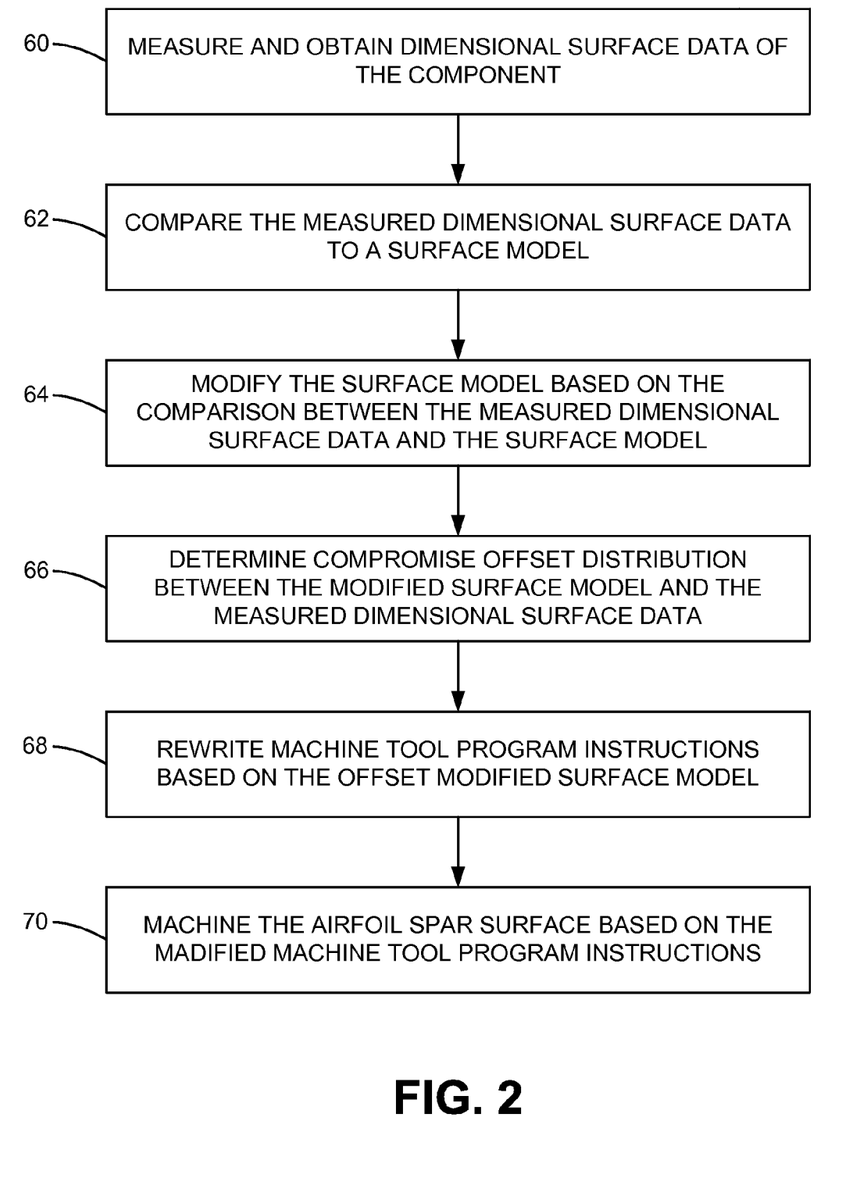
FIG. 2 is a flowchart illustrating an example adaptive machining technique.

FIG. 2 is a flow chart illustrating an example adaptive machining technique performed by adaptive machining system 10. Initially, an airfoil spar that is to be machined is mounted in component measuring device 14 or a mounting fixture of component measuring device 14. For convenience and brevity of description, adaptive machining system 10 will be described hereafter on the basis that the airfoil spar is mounted in a moveable fixture that is moveable between, and therefore aligned substantially the same way in, component measuring device 14 and NC machine 16, such that adaptive machining system 10 analyzes differences in the orientation of the airfoil spar relative to the moveable fixture, and any difference in the orientation of the mounting fixture in the machines is resolved outside of adaptive machining system 10. As will be appreciated by those skilled in the art, adaptive machining system 10 need not be limited to a moveable-type mounting fixture, and other examples are contemplated. For example, each of component measuring device 14 and NC machine 16 can have its own mounting fixture. In other examples, component measuring device 14 and NC machine 16 can be the same machine so that there is no transferring of the airfoil spar mounting fixture, or the airfoil spar, from component measuring device 14 to NC machine 16 is necessary.

System controller 20 can be configured to control component measuring device 14 to measure and obtain dimensional surface data of the airfoil spar (60). Component measuring device 14 can include any suitable machine capable of measuring dimensional surface data of the airfoil spar. In some examples, component measuring device 14 can include, for example, a coordinate measuring machine (CMM) that determines coordinates of points at multiple locations of the airfoil spar surface. Component measuring device 14 can additionally and/or alternatively measure geometric characteristics other than and/or related to the dimensional surface data of the airfoil spar. In some examples, component measuring device 14 can measure and obtain data points in six degrees of freedom, for example, translation and rotation with respect to three different perpendicular axes. The measured dimensional surface data can include any number, or set or multiple sets, of point coordinates that component measuring device 14 determines to be on the surface of the airfoil spar at various (different) locations. As will be appreciated, the greater the number of points, which can be in the hundreds to millions or more, in a set or multiple sets, the more robust the measured dimensional surface data will be in establishing the shape (and location) of the airfoil spar.

Component measuring device 14 supplies the measured dimensional surface data of the airfoil spar to model transformation determination unit 32 of adaptive machining controller 30. Model transformation determination unit 32 compares the measured dimensional surface data to an electronic surface model 40 of the airfoil spar (62). Electronic surface model 40 can be supplied by, for example, system controller 20, and/or a user interface, and/or over a network connection, to name a few. Electronic surface model 40 can comprise any suitable mathematical model, for example, in the form of one or more curves or surfaces, including splines or non-uniform rational basis splines (NURBS), for example, that represent (model) the airfoil spar surface. In some examples, electronic surface model 40 can include a design intent surface of the airfoil spar, defined by, for example, CAD spline knots. In some examples, the design intent surface can represent the ideal surface of the airfoil spar, that is the "perfect world" representation of the component surface, before, for example, the consideration of tolerances.

In some examples, when comparing the measured dimensional surface data to electronic surface model 40 of the airfoil spar (62), model transformation determination unit 32 can compare a set of the measured dimensional surface data to a location of the design intent surface that is interpolated from the CAD spline knots. In some examples, component measuring device 14 can determine the coordinates of the points in a set relative to the coordinate system of component measuring device 14, and model transformation determination unit 32 can determine the coordinates of the same points relative to the coordinate system in which the airfoil spar was designed, such as the design intent surface of the airfoil spar.

Model transformation determination unit 32 of adaptive machining controller 30 can be configured to modify the electronic surface model 40 based on the comparison between the measured dimensional surface data and electronic surface model 40 (64). Alternatively, model transformation determination unit 32 can be configured to output the results of the comparison between the measured dimensional surface data and electronic surface model 40 to offset distribution determination unit 34 and/or program modification unit 36, both or either of which can be configured to modify electronic surface model 40, or a portion thereof, based on the comparison. Alternatively and/or additionally, model transformation determination unit 32, offset distribution determination unit 34, and program modification unit 36, can modify a portion of electronic surface model 40 based on the comparison. For purposes of brevity, the description herein describes modification of electronic surface model 40 by model transformation determination unit 32.

In some examples, model transformation determination unit 32 (and/or offset distribution determination unit 34 and/or program modification unit 36) can be configured to modify electronic surface model 40 by performing a six degree of freedom (DOF) best-fit of electronic surface model 40 to the measured dimensional surface data. In some examples, model transformation determination unit 32 best-fits electronic surface model 40, such as the design intent surface, to the measured dimensional surface data to account for possible misalignment caused by, for example, uncertainty in the orientation of the airfoil spar in the mounting fixture of the component measuring device 14. Model transformation determination unit 32 need not be limited to modification of electronic surface model 40, and other examples are contemplated. Thus, for example, model transformation determination unit 32 can additionally and/or alternatively be configured to modify the measured dimensional surface data based on the comparison between the measured dimensional surface data and electronic surface model 40. In some examples, model transformation determination unit 32 can be configured to perform a best-fitting procedure to account for possible misalignment, for example, by transforming either the coordinates of electronic surface model 40 or the coordinates of the measuring dimensional surface data by three (each) rigid-body translations and rotations.

In some examples, model transformation determination unit 32 can modify the design intent surface defined by the CAD spline knots. For example, model transformation determination unit 32 can rotate and translate the design intent surface definition, or a subset of the design intent surface definition, to best-fit the measured dimensional surface data, or a subset of the measured dimensional surface data. In some examples, the rotation and translation can compensate for misalignment of the airfoil spar in the mounting fixture of component measuring device 14 (or misalignment of the airfoil spar in component measuring device 14). As will be appreciated, any number of factors can contribute to misalignment of the airfoil spar. For example, the airfoil spar could be misaligned in the mounting fixture of component measuring device 14 because of operator error, or because the airfoil spar has a local shape deviation at the location of one of the contact points that determine the airfoil spar's position in the mounting fixture of component measuring device 14. In some examples, model transformation determination unit 32 can be configured to determine what rigid body translations and rotations can make the airfoil spar appear closest to, or substantially closest to, the design intent surface. In other examples, for example in instances in which there is relatively minimal or no misalignment, model transformation determination unit 32 can be configured to perform best-fit rigid body rotations and translations to reduce the amount of machining required to make an acceptable airfoil spar, as it reorients the deviated airfoil spar to make it fit closest into, or substantially closest into, a desired shape envelope.

In some examples, model transformation determination unit 32 can be configured to modify electronic surface model 40 using any suitable numerical analysis. For example, model transformation determination unit 32 can use a weighted nonlinear least squares minimization to rotate and translate the design intent definition. Further, any suitable techniques for solving multidimensional nonlinear problems can be employed; non-limiting examples include Newton-Raphson, sequential over-relaxation, genetic algorithms, gradient methods, among others.

In the illustrated example, model transformation determination unit 32 outputs the modified electronic surface model, for example in the form of coordinates of the modified design intent definition (spline knots), to offset distribution determination unit 34 of adaptive machining controller 30. Offset distribution determination unit 34 can be configured to determine a compromise offset distribution between the modified electronic surface model and the measured dimensional surface data (66). In other examples, model transformation determination unit 32 can be configured to output the modified electronic surface model to program modification unit 36, and program modification unit 36 can be configured to apply a compromise offset distribution to the modified electronic surface model, where offset distribution determination unit 34 determines the compromise offset distribution between electronic surface model 40 and the measured dimensional surface data. For purposes of brevity, the description that follows describes determining the compromise offset distribution between the modified electronic surface model and the measured dimensional surface data, it being understood that the description can apply similarly to a compromise offset distribution between electronic surface model 40 and the measured dimensional surface data.

Factors that offset distribution determination unit 34 can be configured to consider in determining the compromise offset distribution include component functionality and subsequent manufacturing steps. For example, offset distribution determination unit 34 can be configured to consider retaining actual shape of the deviated component as-is, for example, to avoid extensive re-machining; achieving the original desired shape, for example, the design intent definition; achieving functionality requirements, including, but not limited to, smoothness, of the final component in the gas turbine engine; and/or achieving smoothness requirements for subsequent manufacturing processing of the component. As will be appreciated, attempting to meet one factor can invariably increase the extent to which another factor is missed. Consequently, offset distribution determination unit 34 can be configured to determine a compromise offset determination by compromising amongst the factors to produce a component compromise offset distribution.

In some examples, offset distribution determination unit 34 can be configured to determine the compromise offset distribution by morphing, that is smoothing, the modified electronic surface model, while adhering to specified constraints, that is tolerances, on contour and rate of contour deviation. Thus, in some examples, offset distribution determination unit 34 can be configured to determine a compromise offset distribution on the coordinates of the modified design intent definition (spline knots) data to obtain a compromised airfoil spar surface that is a compromise between the modified design intent definition (spline knots) data and the measured dimensional surface data provided by component measuring device 14.

In some examples, offset distribution determination unit 34 can determine a set of spline knots that include the locations at which offsets are defined and optimized by offset distribution determination unit 34. In some examples in which the compromise offset distribution is to be incorporated into the modified design intent definition (or design definition), the compromise offset distribution can be done at all of the spline knots of the modified design intent definition (or design definition). In some examples in which there is more than one parametric spline surface defining the airfoil spar, each such surface can have its own compromise offset distribution. Offset distribution determination unit 34 can determine the compromise offset distribution as a function of the chordwise and spanwise location of the airfoil spar surface, that is the chordwise and spanwise spline parameters that map locations on the airfoil spar.

In some examples, offset distribution determination unit 34 can be configured to force or guide the offset distribution to be sufficiently "smooth", that is control smoothness, by adjusting the number of spline knots that define the compromise offset distribution. For example, offset distribution determination unit 34 can be configured to limit the number spline knots at which the offset values are optimized. Coarse spline interpretations having relatively fewer knots are typically smoother than fine spline interpretations having relatively more knots. In other examples, offset distribution determination unit 34 can be configured to specify a constraint or tolerance on the magnitude and slope of the offset. For example, offset distribution determination unit 34 can constrain the rate of change of the interpolated offset distribution with respect to distance (location) around the airfoil spar.

In some examples, offset distribution determination unit 34 can be configured to determine a compromise offset distribution using any suitable numerical analysis. For example, offset distribution determination unit 34 can be configured to use a weighted nonlinear least squares minimization to define the compromise offset distribution. Further, any suitable techniques for solving multidimensional nonlinear problems can be employed; non-limiting examples include Newton-Raphson, sequential over-relaxation, genetic algorithms, gradient methods, among others.

In some examples, offset distribution determination unit 34 can be configured to output the compromise offset distribution to program modification unit 36 of adaptive machining controller 30. Offset distribution determination unit 34 can be configured to pass the compromise offset distribution to program modification unit 36 in any number of ways. For example, offset distribution determination unit 34 can communicate the compromise offset distribution data to program modification unit 36, where program modification unit 36 can apply the compromise offset distribution data to electronic surface model 40, such as the design intent definition, or to the modified electronic surface model such as the modified design intent definition. As another example, offset distribution determination unit 34 can apply the compromise offset distribution to electronic surface model 40, or to the modified electronic surface model, so that program modification unit 36 sees only the offset electronic surface model, or the offset modified electronic surface model. In the latter example, each coordinate of electronic surface model 40 (e.g., design intent definition), or modified electronic surface model (e.g., modified design intent definition), is moved normal to the original electronic surface model surface (e.g., design intent definition surface), or the modified electronic surface model surface (e.g., modified design intent definition surface), by the magnitude of the offset interpolated at that location. For purposes of brevity, the description that follows describes program modification based on an electronic surface model that has been modified and offset, it being understood that the description can apply similarly to an electronic surface model that is modified and/or offset by program modification unit 36.

In some examples, program modification unit 36 is configured to modify, for example by rewriting, machine tool program instructions 50 based on the offset modified electronic surface model supplied by offset distribution determination unit 34 (68). Machine tool program instructions 50 provide instructions, for example in G-code language, for controlling a machine tool path of NC machine 16. Machine tool program instructions 50 can be supplied by, for example, system controller 20, and/or a user interface, and/or over a network connection, to name a few. Machine tool program instructions 50 can comprise any suitable control instructions for the machine tool, for example, instructions for feed rate, spindle speed, axes motion, among others.

In some examples, machine tool program instructions 50 include the machine tool program instructions developed for milling the design intent airfoil spar surface, that is, the originally coded program instructions for the airfoil spar surface, and program modification unit 36 modifies machine tool program instructions 50 (for example, the G-code) line by line to reshape the design intent airfoil spar surface to the offset modified electronic surface model, that is the compromised contour, supplied by offset distribution determination unit 34.

In some examples, program modification unit 36 supplies the modified machine tool program instructions to NC machine 16, and NC machine 16 machines the airfoil spar surface based on the modified machine tool program instructions (70). System controller 20 can be configured to control NC machine 16, or NC machine 16 can have its own control system. In some examples, NC machine 16 can include a numerically controlled milling machine that mills the airfoil spar surface.

Adaptive machining controller 30 enables a user flexibility relative to handling the various data. A user can choose to incorporate changes into electronic surface model 40 or pass along the changes to be applied to the previous model by the next unit, with respect to both model transformation determination unit 32 to offset distribution determination unit 34 and offset distribution determination unit 34 to program modification unit 36. In some examples, program modification unit 36 can be configured to read electronic surface model 40, for example, a design definition, and the updates from both model transformation determination unit 32 and offset distribution determination unit 34 and apply them both before program modification unit 36 proceeds with modifying machine tool program instructions 50.

The described adaptive machining system 10, and its function, can be employed in the manufacture of a gas turbine engine airfoil, for example, a complexly cooled multi-walled airfoil, from a casting such as a simple single walled casting. Thus, initially an airfoil spar casting can be provided that has an outer surface comprising a plurality, for example hundreds to thousands, of pedestals. In some examples, the pedestals serve to cool the airfoil during operation of the gas turbine engine. In some examples, the overall contour tolerance of the as-cast bond surface can be +/−0.0075 inch (plus/minus 0.0075 inch). Coversheets may be later bonded to the tops, or distal ends, of the pedestals, and thus it is desirable that the tops of the pedestals define a smooth and continuous surface.

To prepare the as-cast bond surface for such coversheet bonding, that is, to prepare a smooth and continuous surface, material is removed from the as-cast airfoil spar. The material can be removed by any suitable means, for example, by high speed milling or a similar process. In some examples, adaptive machining system 10 can be configured to remove the material, for example about 0.001 to 0.002 inch of material, from the airfoil spar surface. In doing so, adaptive machining system 10 can carry out the technique of the FIG. 2 flowchart, as described above, or any alternative example or form thereof, as described above. In some examples, NC machine 36 of adaptive machining system 10 machines the airfoil spar surface to within a +/−0.001 inch (plus/minus 0.001 inch) pedestal height tolerance. In some examples, NC machine 36 can machine the airfoil spar surface to have a "smooth and continuous" contour, for example, when the rate of contour deviation in the contour is within 0.005 in/in (0.005 inch/inch).

After adaptive machining system 10 prepares the airfoil spar surface to have a smooth and continuous surface, one or more coversheets can be bonded to the plurality of pedestals. Adaptive machining system 10 can further include a bonding machine that, for example, metallurgically bonds the coversheet, or multiple coversheets, to the airfoil spar surface, more specifically to the tops of the pedestals, to produce an airfoil spar.

Figure 3:
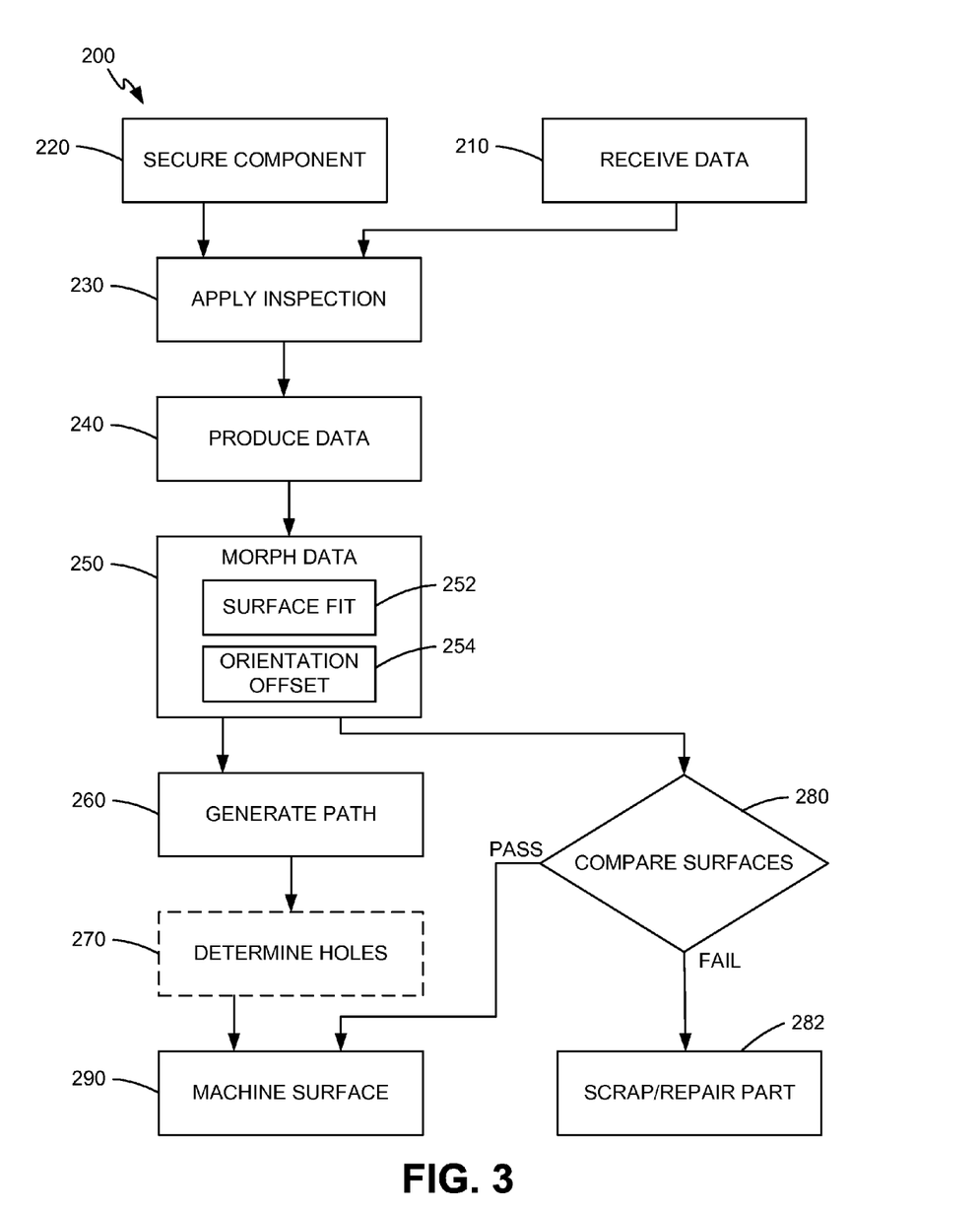
FIG. 3 is a flow diagram of a machining method of one example of the present application.

FIG. 3 is a flow diagram representing a process 200 from an example of the present application. As an example, process 200 may be implemented by adaptive machining system 10 of FIG. 1. Process 200 can include operation 210 where a design surface data set for a component is received. The design surface data set can, for example, include data interpolated from CAD data that defines the design intent surface of the component. Process 200 can include a fixturing operation 220 where the component is placed in a fixture. In some examples, the fixture is capable of being maintained with the component throughout process 200.

Process 200 can proceed with an inspection operation 230. In various examples, operation 230 can include a visual or optical inspection process, a radiant energy inspection process, and the like. Operation 230 can include non-contact optical inspection systems such as white light scanners. In other examples, operation 230 can include other inspection systems such as laser scanners, CT scanners and the like. In further examples, operation 230 can include contact inspection techniques such as CMM for example. Another example can further include a resolution for the inspection process of 0.0002". A still further example can include a resolution of 0.0002" for a complex surface pattern in preparation for a bonding process. Operation 230 may produce a digital image or a data cloud of the subject component surface.

Operation 240 of process 200 can include producing a component surface data set in response to the inspection data of operation 230. In one example, the component surface data set can be in response to the relation between a component and a fixture the component is placed in during operation 220.

Process 200 includes a modifying operation 250. Operation 250 includes morphing the component surface data set with operation 252 and operation 254. For one example in operation 252, the component surface data set is modified to include a modified surface data set determined by rotating and translating the design surface data set in response to mathematical manipulation of the dimensions and features of the component surface data set.

Operation 250 of one example can include image processing with 10 degrees of morphing capability. In a further example, operation 250 can include morphing the data cloud to redefine the component surface and apply hole vectors. Operation 250 can include producing a morphed surface data set in response to the digital image and a design model of the component. Operation 250 can include producing a morphed surface data set in response to the digital image and the design model when limiting a rate of deviation for the morphed surface data set.

Operation 254 can create an orientation offset data set in response to the design surface data set received in operation 210, the component surface data set obtained in operation 252 and a rate of deviation constraint. For example, a surface of a component can have a defined contour variation but rapid changes in the contour can be limited to reduce the adverse impact on properties such as aerodynamics, cooling and bonding. The rate of deviation constraint in some examples can include a quantitative value of typically 0.005 in/in for high Mach, controlled shock airfoils or for bonded surfaces of airfoil components.

Operation 250 further modifies the modified surface data set in response to the orientation offset data set to form a new surface data set.

Process 200 further includes operation 260 which generates a machining path in response to the new surface data set. Operation 260 can include a machining equipment code generating operation where new code is generated in response to at least one of the morphed surface data set, the design model data set, and the inspection determination. The new code may be applied to a machining system.

The machining code generated in operation 260 to direct a high speed milling machine to shape the component surface for operation 290. In one example, the milling operation can produce a component surface prepared for a bonding process. Milling can include high speed milling systems, conventional machining systems, rapid prototype machining systems, and the like. The machining path of operation 260 can drive a numerically controlled mill in operation 290 to mill the component to reflect the new surface data set. The component deviates from the design surface data set from operation 210, but is consistent with at least one of the modified surface data set and the new surface data set based on operations 250 and 252. In addition to machining a new surface, the machining path can include hole locations and hole angles determined in operation 270. Operation 270 can provide adaptive hole locations with angles properly determined in accordance the component surface data set and the new surface data set.

Further, process 200 can include an optional inspection operation 280 to compare the morphed new surface data set with the design surface data set received in operation 210 per inspection criteria. In order to save time, operation 280 may be performed in parallel with operations 260 and/or 270. The comparison of operation 280 can assign the degree of variation in the component surface modified to the new surface data set in relation to the design surface data set. A quality control determination can be made in response to the degree of variation in relation to a threshold. This quality control determination can be made to predict a quality outcome before a component is machined to allow for early scrap or repair 282.

In inspection operation 280, the morphed surface data set may be used as a comparison. In one example, the morphed surface data set is a morphed layered surface pattern which is compared with a design model data set. Operation 280 can further include determining a degree of surface variation when comparing the morphed surface data set to the design model per inspection criteria. An analysis of the degree of surface variation as part of operation 2800 can include a determination of a good component when the variation is within acceptable limits, a bad component when the variation is outside acceptable limits or a repairable component if the variation can be reduced to acceptable limits. This quality control determination can be made to predict a quality outcome before a component is machined to allow for early scrap or repair 282.

In some examples, process 200 may be used to form thin film cooling holes, such a thin film cooling holes within components of a gas turbine engine. Components in a gas turbine engine are often cooled to survive the high temperatures found therein. Thin film cooling by a supply of air, used as a cooling fluid, may be provided to a passage within the component, exiting via cooling holes to form a thin film over the external surface of the component. In addition to removing heat from the component by conduction, the thin film of cooling air serves to prevent hot gas within the gas turbine engine impinging upon the component.

The cooling air used for thin film cooling must be supplied at a pressure greater than the gas path pressure in which the component is operating. This requires work to be carried out on the cooling air, representing a loss of useful power from the engine. In some examples, machining or laser drilling may be used to form films holes having consistent diameters for thin film cooling.

Figure 4A:
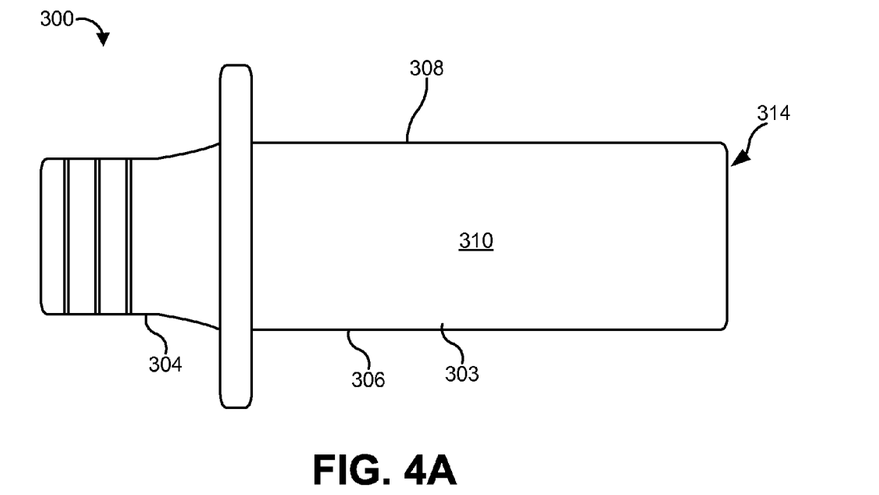
FIGS. 4A-C are conceptual diagrams of an example blade airfoil configured for use in a gas turbine engine, the airfoil including thin film cooling holes as disclosed herein.
Figure 4B:
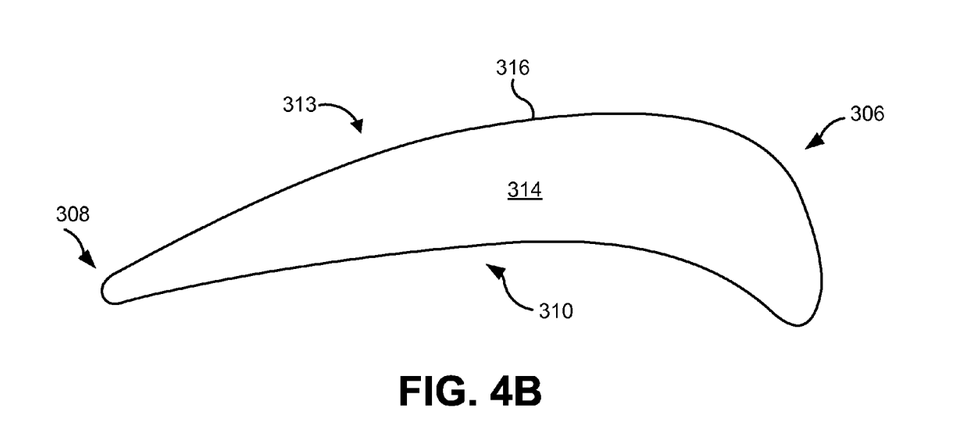
Figure 4C:
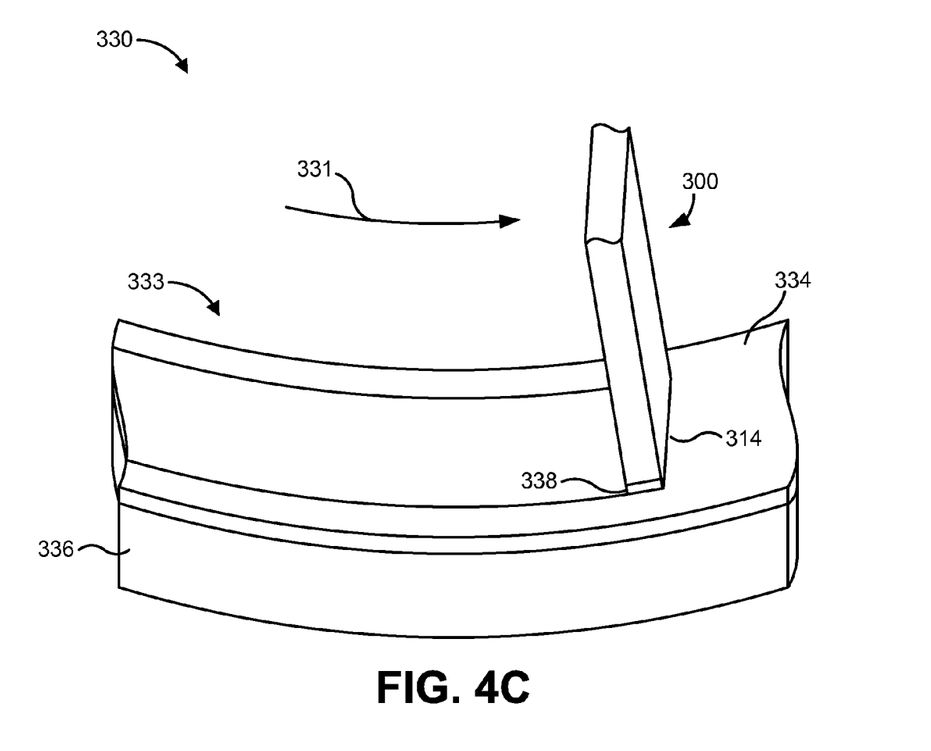

FIGS. 4A-C illustrate different views of an example blade 300 which may include features and arrays of features, such as thin film cooling holes, according to an example of the disclosure. Blade 300 generally includes airfoil 303 attached to stalk 304. Airfoil 303 includes a leading edge 306, a trailing edge 308, a pressure sidewall 310, and a suction sidewall 313. Pressure sidewall 310 is connected to suction sidewall 313 at leading edge 306 and trailing edge 308. Further, blade 300 defines blade tip 314, which is a surface substantially orthogonal to leading edge 306. Blade tip 314 is defined by an edge 316 that extends about the perimeter of the surface of blade tip 314, and separates the surface of blade tip 314 from the adjacent surface of airfoil 303. Leading edge 306, trailing edge 308, pressure sidewall 310, and suction side wall 313 generally extend from stalk 304 to edge 316.

In general, blade 300 is a component of a mechanical system including, e.g., a gas turbine engine. In different examples, blade 300 may be a compressor blade that imparts kinetic energy into a fluid or a turbine blade that extracts kinetic energy from a moving fluid. FIG. 4C is a conceptual diagram of an example gas turbine engine 330 with blade 300. Gas turbine engine 330 includes blade track or blade shroud 333, which is defined into a surface 334 of a turbine substrate 336. Blade 300 is shown with a tip coating 338, which is described in greater detail below, deposited on blade tip 314. Although a single blade 300 is shown in gas turbine engine 330 for ease of description, in actual operation, gas turbine engine 330 may include a plurality of blades.

During operation of gas turbine engine 330, blade 300 rotates relative to blade track 333 in a direction indicated by arrow 331. In general, the power and efficiency of gas turbine engine 330 can be increased by reducing the gap blade track 333 and blade 300, e.g., to reduce or eliminate gas leakage around blade 300. Thus, gas turbine engine 330, in various examples, is configured to allow blade 300 to abrade into surface 334 of turbine substrate 336, thereby defining blade track 333, which creates a seal between blade track 333 and blade 300. The abrading action may create high thermal and shear stress forces at blade tip 314. In addition, occasional movement of blade tip 314 relative to turbine substrate 336 during the operation of gas turbine engine 333 may cause blade tip 314 to impinge on turbine substrate 336, creating high shear forces at blade tip 314.

To protect against the various forces acting on blade 300 and, in particular, blade tip 314, one or more protective layers may be provided on blade 300 and/or blade tip 314. For example, a tip coating 338, may be provided on blade tip 314 to improve different properties of an underlying blade surface including, e.g., wear, corrosion, hardness, and/or temperature resistance properties of an underlying blade surface. Additionally or alternatively, a protective coating may be applied to an entire airfoil 303, including blade tip 314, to improve different properties of an underlying blade surface. In some examples, airfoil 303 may receive a coating that reduces or substantially eliminates the effects of oxidation or corrosion on airfoil 303. Regardless of the specific number or specific type of coatings applied to blade 300, in some examples, blade 300 may benefit from the features and arrays of features, such as thin film cooling holes.

An airfoil, such as blade 300, may include additional machined features, which may be machined in conjunction with the machining of thin film cooling holes to further reduce the cycle time required to the blade airfoil. For example, machining to produce a blade airfoil, such as blade 300, may include gating removal and/or throat machining at the leading edge of the blade airfoil. As another example, machining to produce a blade airfoil 340 may include hole drilling along the trailing edge of the blade airfoil. As further examples, machining to produce a blade airfoil may also include slash face along fore and aft faces and/or tip cap finishing. Each of these machining processes may be implemented as part of process 200 in combination with machining of thin film cooling holes to further reduce the cycle time required to machine a blade airfoil, e.g., by only needing to determine the position of the blade airfoil once and machining each of these features while the blade airfoil is held in the same position. In addition, more than one feature may potentially be machined simultaneously on blade airfoil to further reduce cycle time.

Figure 5:
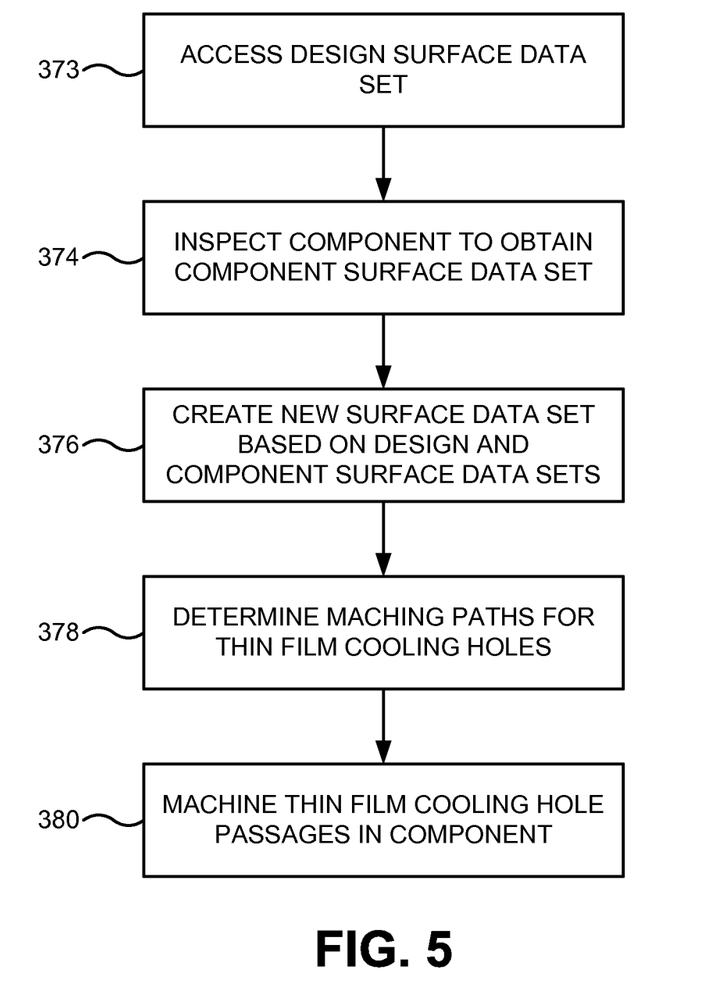
FIG. 5 is a flowchart illustrating example techniques for machining thin film cooling holes in a component.

FIG. 5 is a flowchart illustrating example techniques for machining thin film cooling holes in a component, such as thin film cooling holes within blade 300. First, a machining control system (not shown) accesses a design surface data set (373). Then, the machining control system inspects blade 300 to obtain a component surface data set that includes surface data for blade 300 (374). The machining control system creates a new surface data set based on the design surface data set and the component surface data set, the new surface data set approximating the design surface data set while accounting for variation between a component specified by the design surface data set and the component surface data set (376).

Then the machining control system based on the new component surface data set, and thereby also based on the design surface data set and the component surface data set (378). For each of the thin film cooling holes, the machining control system issues instructions to machining a passage between two surfaces of blade 300 (380). Machining each passage may include multiple passes with the cutting tool, e.g., to produce complex cooling hole geometries.

One aspect of the present application is a method including receiving a design surface data set; securing a component in a fixture; producing a component surface data set of the component in relation to the fixture; morphing the component surface data set, including creating a modified surface data set in response to the design surface data set and the component surface data set; creating an orientation offset data set in response to the design surface data set, the modified surface data set and a rate of deviation constraint, and creating a new surface data set in response to the orientation offset data set and the modified surface data set; generating a machining path in response to the new surface data set; and machining the component in response to the machining path.

Features of this aspect can include producing the component surface data set by applying an inspection system, determining a hole location in response to the component surface data set of the component in relation to the fixture and machining the component in response to the machining path and the hole location, and determining a degree of variation in response to the new surface data set and the design surface data set and predicting a quality outcome in response to the degree of variation.

Another example of the present application relates to techniques for adaptively machining complex shaped component surfaces before a bonding process and drilling holes according to a high precision pattern. For such an example, a high precision surface pattern can include an array of pedestals and holes in two or more layers of material. The layers of material are subsequently diffusion bonded into a laminated configuration. In various examples, surface preparation of the bonded surface component can be performed before diffusion bonding the material layers and putting holes in designed locations with correct angles.

An example of this application is capable of addressing a complex surface and using multiple degrees of freedom (6+) to adaptively optimize a machined surface. The adaptability of examples of the present application can contribute to overcoming the conflict between the high variability nature of casting components and the high precision requirements of bond surfaces, hole locations and hole angles.

Features of an example can include securing the component in a fixture, taking data cloud measurements of the component and fixture using white light inspection system, morphing the data cloud measurements against a design model, generating a new machining surface, defining the hole drilling locations, comparing the new machining surface with the design model, machining the component according to the new machining surface with hole vectors and locations.

In one example, the system can include a fixture which follows or is maintained with the component throughout the process. In some examples, the fixture can follow or be maintained with the component through an inspection system, a computer station during optimization of the surface, and a machining station.

Another example of the present disclosure includes an adaptive approach for machining a bonded component surface and adaptively putting holes in the component. In yet another example, a system can provide a method and apparatus to adaptively machine a complex shaped bonded surface component with a complex pattern on the surface according to an optimized morphed surface design generated from a white light data cloud. The system of this example can provide a method to adaptively position hole locations having set angles in accordance with the surface generated from the white light data cloud.

In a further example, this system can accurately machine a component surface to match with a bonding contour of a mating component. A system of an example of the present application is capable of automating a surface preparation procedure of surface bonded components and reducing a manual polishing process.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Various examples have been described. These and other examples are within the scope of the following claims.

What is claimed is:

1. A method comprising:
receiving a design surface data set;
for each of a batch of components, obtaining a component surface data set from the inspection of a component, wherein multiple components in the batch of have slight variations in size and/or surface geometries as compared to the design surface data set;
for each of the batch of components, creating a modified surface data set in response to the design surface data set and the component surface data set;
for each of the batch of components, creating an orientation offset data set in response to the design surface data set, the modified surface data set and a rate of contour deviation constraint, wherein the rate of contour deviation constraint is less than 0.005 inch/inch;
for each of the batch of components, creating a new surface data set in response to the orientation offset data set and the modified surface data set;
for each of the batch of components, generating a machining path in response to the modified surface data set, wherein generating the machining path in response to the modified surface data set includes generating the machining path in response to the new surface data set; and
for each of the batch of components, machining the component in response to the machining path to produce a machined component according to the modified surface data set, wherein the machined component deviates from the design surface data set and is consistent with the new surface data set.

2. The method of claim 1, for each of the batch of components, further comprising inspecting the component with a non-contact optical inspection system to obtain the component surface data set.

3. The method of claim 1, further comprising, for each of the batch of components, prior to machining the component, determining the component meets a quality control standard by comparing the modified surface data set with the design surface data set.

4. The method of claim 1, further including, for each of the batch of components, prior to machining the component, determining a degree of variation in response to the new surface data set and the design surface data set and predicting a quality outcome in response to the degree of variation.

5. The method of claim 1, further comprising, for each of the batch of components, securing the component in a fixture, wherein the inspection of the component includes inspection of the component in relation to the fixture.

6. The method of claim 5, further comprising, for each of the batch of components, determining a hole location in response to the component surface data set of the component in relation to the fixture.

7. The method of claim 6, wherein, for each of the batch of components, machining the component in response to the machining path further includes machining the component in response to the machining path and the hole location.

8. An adaptive machining system comprising:
a processor configured to:
compare electronic measured component surface data set of a component with a design surface data set of the component,
create an orientation offset data set in response to the design surface data set, the modified surface data set and a rate of contour deviation constraint, wherein the rate of contour deviation constraint is less than 0.005 inch/inch,
create a new surface data set in response to the orientation offset data set and the modified surface data set, and
create a modified surface data set in response to the design surface data set and the component surface data set, and generate a machining path in response to the modified surface data set, wherein generating the machining path in response to the modified surface data set includes generating the machining path in response to the new surface data set; and
a numerical control machine configured to machine the component according to the machining path to produce a machined component according to the modified surface data set, wherein the machined component sufficiently deviates from the design surface data set to be consistent with the new surface data set.

9. The adaptive machining system of claim 8, wherein the processor is further configured to determine the component meets a quality control standard by comparing the modified surface data set with the design surface data set.

10. The adaptive machining system of claim 8, wherein the processor is further configured to:
determine a degree of variation in response to the new surface data set and the design surface data set; and
predict a quality outcome in response to the degree of variation.

11. The adaptive machining system of claim 8, further comprising a non-contact optical inspection system configured to inspect the component to obtain the component surface data set.

12. The adaptive machining system of claim 11, further comprising a fixture configured to secure the component, wherein the non-contact optical inspection system is configured to inspect the component in relation to the fixture.

13. The adaptive machining system of claim 12, wherein the processor is further configured to determine a hole location in response to the component surface data set of the component in relation to the fixture.

14. The adaptive machining system of claim 13, wherein the numerical control machine is configured to machine the component in response to the machining path and the hole location.

15. A non-transitory computer system-readable storage medium that stores computer system-executable instructions that, when executed, configure a computer system to:
receive a design surface data set;
obtain a component surface data set from the inspection of a component;
create a modified surface data set in response to the design surface data set and the component surface data set;
create an orientation offset data set in response to the design surface data set, the modified surface data set and a rate of contour deviation constraint, wherein the rate of contour deviation constraint is less than 0.005 inch/inch;
create a new surface data set in response to the orientation offset data set and the modified surface data set, wherein generating the machining path in response to the modified surface data set includes generating the machining path in response to the new surface data set;
generate a machining path in response to the modified surface data set; and
communicate the machining path to numerical control machine configured to machine the component according to the machining path to cause the machined component to sufficiently deviate from the design surface data set to be consistent with the new surface data set.

16. The non-transitory computer system-readable storage medium of claim 15, comprising further instructions that, when executed, configure the computer system to determine the component meets a quality control standard by comparing the modified surface data set with the design surface data set.

17. The non-transitory computer system-readable storage medium of claim 15, comprising further instructions that, when executed, configure the computer system to determine a hole location in response to the component surface data set of the component.

\* \* \* \* \*